United States Patent [19]

Nider

[11] 4,274,344
[45] Jun. 23, 1981

[54] PROCESS FOR CARBONIZING AN AGRICULTURAL PRODUCT

[76] Inventor: William K. Nider, 32 Sunnyside La., Orinda, Calif. 94563

[21] Appl. No.: 57,558

[22] Filed: Jul. 16, 1979

[51] Int. Cl.³ .............................................. F23G 5/06
[52] U.S. Cl. ........................................ 110/346; 34/10; 110/244; 110/246; 432/118
[58] Field of Search ............... 110/346, 243, 244, 246, 110/229; 432/118; 34/108, 130, 131, 132, 10

[56] References Cited

U.S. PATENT DOCUMENTS

| | | | |
|---|---|---|---|
| 1,500,323 | 7/1924 | Jenkins | 201/33 |
| 1,589,417 | 6/1926 | Neilsen | 202/100 |
| 3,593,430 | 7/1971 | Thompson | 34/108 |
| 3,717,937 | 2/1973 | Thompson | 34/108 |
| 3,808,701 | 5/1974 | Bachman | 34/179 |
| 3,838,015 | 9/1974 | Buchbinder et al. | 201/1 |
| 3,901,766 | 8/1975 | Smith | 201/32 |
| 3,990,865 | 11/1976 | Cybriwsky et al. | 48/197 R |
| 4,016,003 | 4/1977 | Stauffer | 134/19 |

FOREIGN PATENT DOCUMENTS

| | | | |
|---|---|---|---|
| 69771 | 12/1975 | Australia | 110/346 |
| 2559528 | 7/1977 | Fed. Rep. of Germany | 110/346 |

*Primary Examiner*—Edward G. Favors
*Attorney, Agent, or Firm*—Robert R. Tipton

[57] ABSTRACT

A process for treating an agricultural product having a high silica content utilizes the steps of supplying hot gases and combustion air to a combustion zone, dispersing the agricultural product in the hot gases and combustion air for controlled burning thereof and then arresting the combustion process after evolution of the volatile constituents and organic matter and prior to oxidation of the carbon constituents remaining in the agricultural product.

9 Claims, 3 Drawing Figures

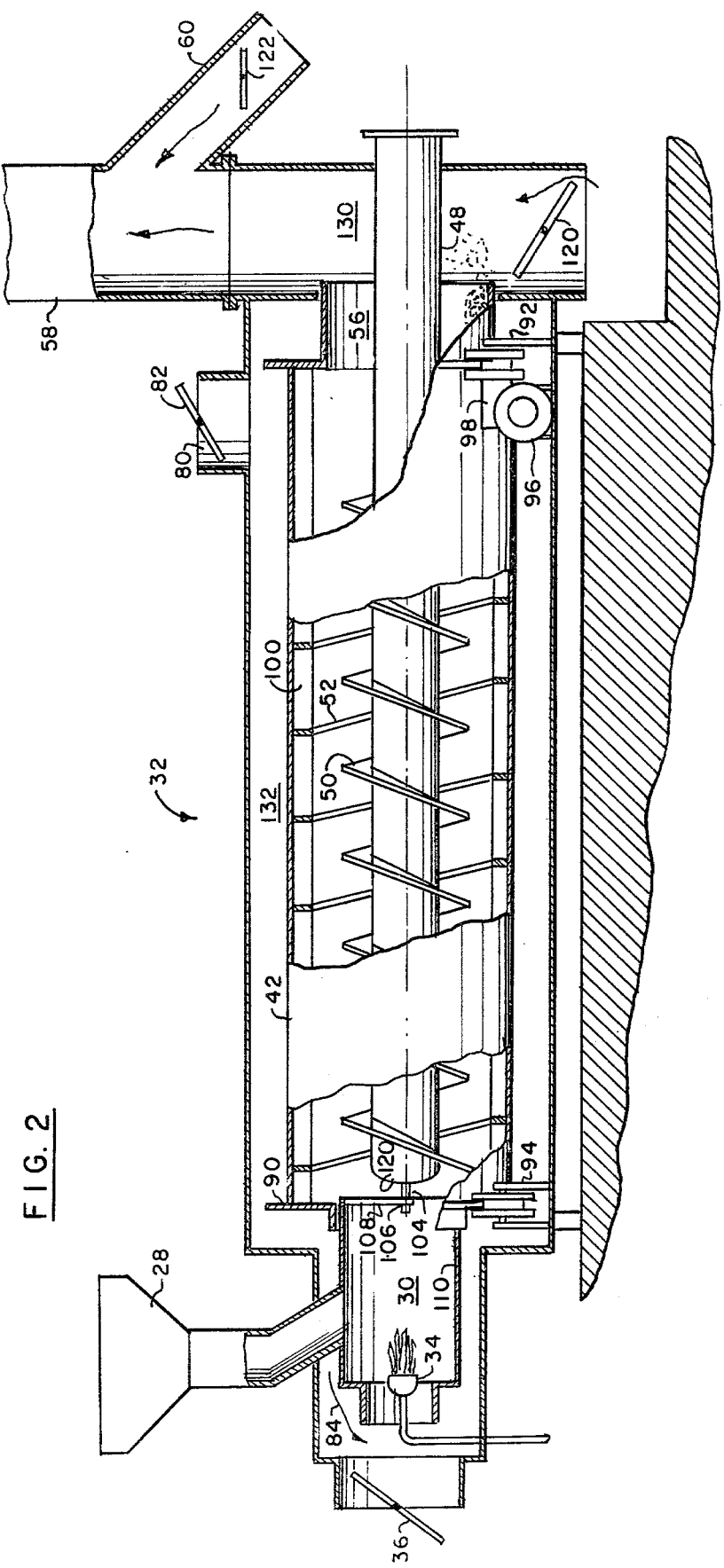

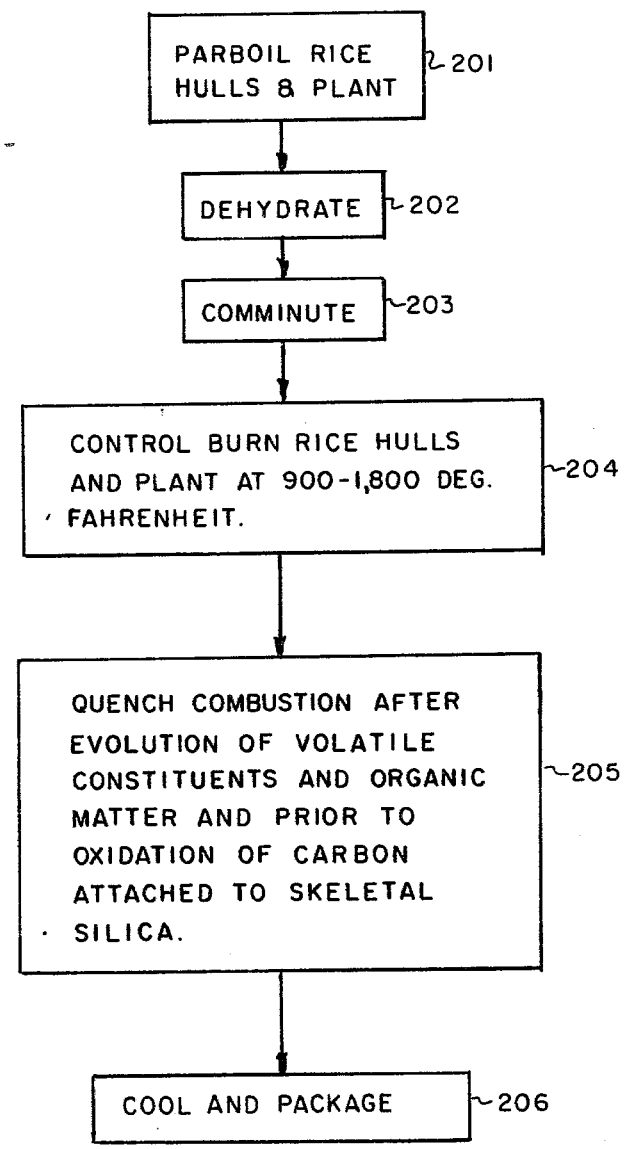

PROCESS FOR CARBONIZING AN AGRICULTURAL PRODUCT

BACKGROUND OF THE PRIOR ART

This invention relates generally to apparatus and processes for treating an agricultural product and in particular to an apparatus and process for carbonizing an agricultural product having a high silica content.

Of the few agricultural products having a high silica content, rice hulls and the rice plant itself represent a major disposal problem where uncontrolled burning of agricultural waste is prohibited by various environmental laws.

By controlling the burning of the rice hull and the rice plant to remove volatile constituents and organic matter leaving only the carbon constituents attached to the skeletal silica in the material, a valuable commercial product is obtained which can be used in other chemical processes.

In prior art processes and apparatus, burning temperatures were controlled to be below the temperature which would cause the skeletal structure of the plant material to fuse but high enough to cause the volatile constituents and organic matter to be removed. The process was performed in a combustion zone in which hot gases and combustion air were swirled about a vertical axis while the hull material was continuously provided to the combustion zone. In the prior art process, the processed hulls would fall, pulled by gravity, through the combustion zone and be removed at the lower portion of the zone. In such an apparatus, the particles would not necessarily fall through the combustion zone at the same velocity because of the variation in particle weight and aerodynamic shape or each particle. Some particles would remain in the combustion zone too long causing the carbon constituent to become oxidized while the heavier and more streamlined particles would pass too quickly through the zone and not be completely processed.

In addition, some of the incompletely processed particles would continue to burn after leaving the combustion zone causing uncontrolled oxidation of the carbon contained in the particles resulting in an inferior product.

Such a process would result in a non-uniform product, especially where the rice plant parts are processed along with the rice hulls.

SUMMARY OF THE INVENTION

A process for treating an agricultural product comprises the steps of supplying the product to a combustion zone along with hot gases and combustion air, then dispersing the product in the hot gases for controlled burning at a temperature below the fusion point of the skeletal silica but sufficient to cause evolution of the volatile constituents and organic matter, then arresting the burning or combustion process after evolution of substantially all of the volatile constituents and organic matter but prior to oxidation of the carbon constituents remaining in the product. In addition, the agricultural product can be parboiled, then dehydrated prior to entering the combustion zone. The agricultural product can also be comminuted prior to being introduced into the combustion zone.

It is, therefore, an object of the present invention to provide an apparatus and process for controlled burning of an agricultural product.

It is a further object of the present invention to provide an apparatus for controlled burning of an agricultural product having a high silica content utilizing a rotatable cylindrical vessel having a horizontal axis of rotation.

It is another object of the present invention to provide an apparatus for controlled burning of an agricultural product leaving carbon attached to the skeletal silica in which hot gases are swirled about inside a rotatable cylindrical vessel utilizing a vortex creating barrier and non-rotatable central support member.

It is yet another object of the present invention to provide an apparatus for controlled burning of an agricultural product in which the combustion is quenched after evolution of the volatile constituents and organic matter but prior to oxidation of the remaining carbon.

It is a further object of the present invention to provide an apparatus for controlled burning of an agricultural product utilizing a combustion zone in which the hot gases are turbulated in a vortex utilizing helical barriers about the inside of the rotatable cylinder.

It is a further object of the present invention to provide a process for treating an agricultural product utilizing hot gases and combustion air for controlled burning of the product and then arresting the burning process after evolution of all the volatile constituents and organic matter but prior to oxidation of the carbon constituents.

It is a further object of the present invention to provide a process for treating an agricultural product in which the agricultural product may be parboiled and then dehydrated prior to its control burning to remove the volatile constituents and organic matter but leave the remaining carbon constituents and skeletal silica.

It is yet another object of the present invention to provide a process for treating an agricultural product in which the product is comminuted prior to being introduced into the combustion zone.

It is yet another object of the present invention to provide a process for treating an agricultural product in which the product is burned under controlled temperature and time conditions at a temperature below the fusion point of the skeletal silica but sufficiently high enough to cause evolution of the volatile constituents and organic matter.

It is yet another object of the present invention to provide a process for treating an agricultural product in which the combustion process is arrested by cold air.

It is a further object of the present invention to provide a process for treating an agricultural product in which the combustion process is arrested by an inert gas.

It is a further object of the present invention to provide a process for treating an agricultural product in which the combustion process is arrested or quenched by water vapor.

These and other object of the present invention will be manifest upon study of the following detailed description when taken together with the drawings.

BRIEF DESCRIPTION OF THE DRAWINGS

FIG. 2 is a partial cross-sectional elevational view of the apparatus for controlled burning of the agricultural product of the present invention.

FIG. 3 is schematic diagram showing the various steps of the process for treating the agricultural product of the present invention.

DESCRIPTION OF THE PREFERRED EMBODIMENT

Figure 1:
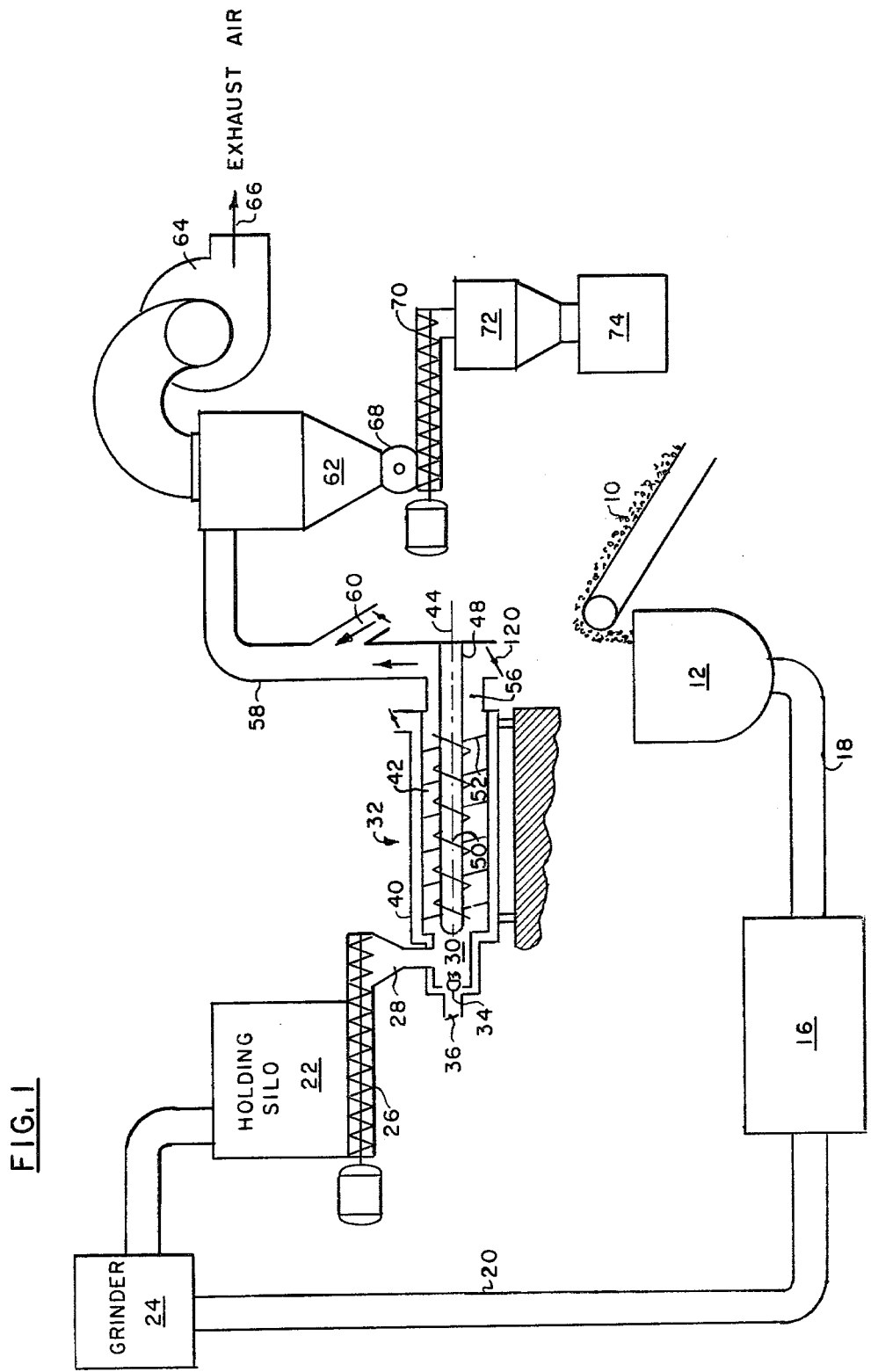
FIG. 1 is a schematic diagram showing the equipment and steps used in processing the agricultural product of the present invention.

The overall process and apparatus for performing the process is best illustrated in FIG. 1 in which the incoming raw agricultural product 10 is conveyed to barboiling vessel 12 by raw material conveyor 14. In parboiler vessel 12 the raw agricultural product is boiled to soften the product and, for rice hulls, to remove the rice kernel for separation from the hull. In most situations, however, the raw agricultural material may be conveyed directly to holding silo 22 or grinder 24.

The parboiled product, namely rice hulls and rice plant material, for example, is conveyed from the parboiler vessel 12 to dehydrator 16 through parboiled product conveyor 18.

The moist product is then dehydrated in dehydrator 16 where it is conveyed by dehydrated products conveyor 20 up to holding silo 22.

Normally the step of parboiling the incoming agricultural product and then dehydrating it is performed at the rice processors plant and can be conveyed to holding silo 22 either by a conveyor 20 as shown, where the distance is short, or by truck where the plant for carbonizing the material is some distance away from the rice processing plant. Prior to entering holding silo 22 the dehydrated product can be ground or comminuted to a uniform particle size by grinder 24.

Screw feed conveyor 26 then transports the dehydrated agricultural product in silo 22 to feed hopper 28 where the material falls into inlet end 30 of furnace 32 which will be described in greater detail below. Burner 34, located proximate inlet end 30 of furnace 32, is used to ignite the material falling from hopper 28, with combustion air entering through combustion air control vent 36 to cause a flow of hot gases and combustion air into inlet end 30 and through furnace 32.

Furnace 32 comprises, basically, an outer housing or shroud 40 enclosing and spaced apart from rotatable cylindrical vessel 42. Rotatable cylindrical vessel 42 has a horizontal axis of rotation 44 which is coincident with its cylindrical axis. Furnace 32 further comprises a central support member 48 which is non-rotatable. Helical barrier 50, attached to central support member 48, and helical barrier 52, attached to the inside surface of rotatable cylindrical vessel 42, are adapted to create a vortex and turbulation of the hot gases and combustion air entering from inlet end 30.

Within rotatable cylindrical vessel 42 is defined a fireball or combustion zone in which the particles of agricultural material are ignited to above their kindling temperature and where the exothermic reaction takes place. The fire ball or combustion zone is defined by an up-stream flame front and a down-stream tail in which the particles of agricultural material are burned under controlled agricultural product to burn under controlled conditions resulting in the evolution of the volatile constituents and the organic matter in the rice hulls and rice plant material. The burned or processed end product material then passes out of cylindrical vessel 42, through outlet end 56, then up through end product air conveyor conduit 58 where the combustion process is then arrested or quenched by burn arrest injector 60.

The particles then pass into end product particle separator 62 which separates the particles from the exhaust gases. The exhaust gases then pass through blower 64 and out into the atmosphere as shown by arrow 66.

The flow of end product particles out of particle separator 62 is controlled by rotary valve 68, which feeds the material into end product conveyor 70 where they are transferred to end product storage bin 72 for later packaging or bagging by end product bagger 74.

The key to the operation of the process of the present invention and its ability to handle high volumes of agricultural product is furnace 32 which is illustrated in greater detail in FIG. 2.

With reference to FIG. 2, furnace 32 comprises, basically, outer housing or heat conserving shroud 40 having a shroud air supply inlet 80 at which is located shroud air supply control vane or damper 82, with the outlet end 84 of shroud 40 located proximate inlet end 30 of furnace 32.

Within housing 40 and spaced apart therefrom is rotatable cylindrical vessel 42 having trunnions 88 and 90 located proximate each end thereof which rest on drive wheels 92 and 94, respectively. Drive wheel 92 is driven by motor 96 through gear box 98.

Along the inside surface of rotatable cylindrical vessel 42 is attached helical barrier 52 whose helical members are separated by a plurality of cleats 100. Cleats 100 are used to lift and disperse the particulate agricultural material into the hot turbulating gases within cylindrical vessel 42.

Also disposed within cylindrical vessel 42 is non-rotatable central member 48 whose longitudinal axis is generally coincident with the axis of rotation of cylindrical vessel 42 and whose end 102, which is located proximate inlet end 30, includes a shaft 104 which is supported by a bracket 106. Bracket 106 is supported by spider 108 which is attached to inlet end housing 110. Inlet end housing 110 does not rotate by projects slightly into rotatable cylindrical vessel 42.

Attached to the outside surface of central support member 48 is helical barrier 50 which is adapted, in cooperation with helical barrier 52, to cause a vortex and turbulation of the hot gases and combustion air passing from inlet end 30 through cylindrical vessel 42 and out of outlet end 56. Barriers 50 and 52 thus insure the uniform burning and processing of the particulate agricultural material within cylindrical vessel 42.

Burner 34 is provided proximate inlet end 30 to generate the hot gases and flame which causes the particulate agricultural material to be ignited as they enter inlet end 30 from hopper 28. Combustion air control vane or damper 36 is located upstream from burner 34 to regulate the flow of combustion air for the controlled burning of the particulate agricultural material in cylindrical vessel 42.

Combustion air moderator valve vane or damper 120 is located proximate outlet end 56 of rotatable cylindrical vessel as a further control of the combustion process. The processed particulate agricultural material is transported by the hot gases through outlet end 56 and through conduit or conveyor 58 where the burning process is immediately quenched through the use of burn arrest injector 60.

Burn arrest injector 60 comprises a control vane 122 which regulates the flow of cold air, water vapor or inert gases into conduit 58 to either cool the material to below its kindling point or starve the area around the particle of oxygen.

With respect to FIG. 3 there is illustrated the steps of the process for treating the agricultural product of the present invention which comprises, basically, the optional step 201 of parboiling the rice hulls and plant material, then the step 202 of dehydrating the parboiled material followed by step 203 of comminuting the dehydrated or raw material which is then, at step 204, placed in the combustion zone on furnace 32. While in the combustion zone, the volatile constituents and organic matter are volatilized by controlled burning at a temperature between 900 and 1,800 degree Fahrenheit, after which, at step 205, the combustion process is quenched or arrested after all of the volatile constituents and organic matter are removed but prior to oxidation of the carbon remaining on the skeletal silica of the agricultural product. At step 206, the particulate end product is then cooled and packaged or bagged as desired.

It is important that the controlled burn be maintained at a temperature between 900 and 1,800 degrees Fahrenheit to avoid fusing or melting the skeletal silica structure of the rice hulls and rice plant materials.

The combustion process can be quenched in either of two ways, by either cooling the particulate end product to below its ignition temperature or by starving the oxygen around the particulate end product to prevent further oxidation of the carbon remaining attached to the skeletal silica. The quenching step is necessary to achieve a uniform high quality product which is high in carbon and low in volatile constituents and organic matter.

Quenching can be accomplished through the use of cold air, water vapor, or through the use of an inert gas such as carbon dioxide or nitrogen.

Central support member 48 can also function as a heat exchanger whereby the excess heat generated by the exothermic reaction of the burning of the rice hulls and rice plant or other agricultural material can be converted into steam which can be used in other steps of the process or to provide electrical energy to assist in running the plant.

To operate furnace 32 of the present invention, rice hulls and rice plant materials are delivered to inlet end 30 through hopper 28 and ignited by burner 34, which combustion is supported by combustion air entering through combustion air control 36. As the hot gases pass into rotatable cylindrical vessel 42, they are caused to turbulate in a vortex manner around central support member 48 by helical barrier 50 and 52. Such vortex action and turbulating of the hot gases permits all the particulate agricultural material to be exposed and the combustion thereof supported in the form of a fireball having a flame front and a combusting tail. In addition, as rotatable cylindrical vessel 42 is rotated by electric motor 96, the heavier particulate material is raised to a higher level by cleats 100 and then allowed to spill down through the hot turbulating gases and combustion air to be transported thereby down the length of cylindrical vessel 42 toward outlet end 56 in stages. Helical barrier 52, which is attached to the inside surface of rotatable cylindrical vessel 42, further assists in transporting the heavier particulate material toward outlet end 56 acting somewhat in the manner of a screw conveyor. After the particulate material reaches outlet end 56 it spills into end plenum 130 where it is carried up into air end product conveyor by the rush of air coming in from combustion air moderator 120. The total volume of air flowing up through conduit 58 is controlled by blower 64 (FIG. 1).

The flow of combustion air into rotatable cylindrical vessel 42 is controlled both by shroud air supply control 82 and combustion air control 36 and moderator valve 120. The flow of air into space 132 between housing 40 and rotatable cylindrical vessel 42 will determine the cooling effect on cylindrical vessel 42 and the rise in temperature of air passing through space 132. By adjusting shroud air supply control 82, combustion air control 36, and the air flow through moderator air valve or damper 120, the combustion rate of the particles within the combustion zone in cylindrical vessel 42 and the temperature surrounding cylindrical vessel 42 can be controlled.

In adjusting the air flow through furnace 32, it is important that the flame front of the fireball be kept within cylindrical vessel 42. Preferably the flame front should be maintained more than half way down vessel 42 in the direction of outlet end 56. The end of the combustion tail of the fireball should terminate proximate outlet end 57 although it could extend into plenum 130. In some cases the tail of the fireball could extend into conduit 58, however, this would tend to cause deterioration of conduit 58 and increase the maintenance costs of the apparatus.

If the flame front is maintained too close to inlet end 30, it has been found that excessive smoke will be generated.

After the fireball is created by the use of igniter 34, the flame level of ignited 34 can be reduced to a point where it will produce only enough hot gases to maintain ignition of the fireball.

The key factor is to adjust the flow of combustion air through cylindrical vessel 42 such that its velocity will maintain the flame front of the fireball at a fixed position within cylindrical vessel 42. At the same time, the amount of feed material entering inlet end 30 from hopper 28 is adjusted to maintain the proper size of the fireball and its tail length without choking vessel 42 with raw material, depending upon the volume flow of combustion air.

The major adjustment of air flow through cylindrical vessel 42 is achieved through the use of moderator valve 120. An increase flow of air through moderator valve 120 will tend to reduce the flow of air through cylindrical vessel 42. Conversely, a decrease in the flow of air through moderator valve 120 will increase the flow of air through cylindrical vessel 42. The total volume of air passing through conduit 58 is, of course, controlled by the velocity of blower 64.

It also can be seen that an increase in quench air through burn arrestor 60 will also decrease the flow of air through cylindrical vessel 42.

Of course, by opening shroud air vent 82 and combustion air vent 36, combustion air through cylindrical vessel 42 can be increased.

It has been found that once the particles that have come through the fireball are reduced in temperature to below 1000 degrees Fahrenheit, the combustion process is quenched. This can be done readily using either cold air or air in which water is aspirated. Both the water vapor and the reduction in air temperature due to evaporative cooling by the water vapor quickly quenches the combustion process of the particles. Also an inert gas such as carbon dioxide or nitrogen can be used.

Steam can also be used to quench the combustion process.

Temperature measurements taken within the fireball indicate a combustion temperature of between 1400 to 1800 degrees Fahrenheit. Observations indicate that the smaller particles of agricultural material tend to pass through the fireball faster than the larger particles. Since the smaller particles have less material to volatilize, they are prevented from being overprocessed, that is, they are quenched before the remaining carbon is oxidixed by the excess combustion air. The larger particles, because they pass through the fireball at a slower rate, are prevented from being underprocessed, that is, left with unvolatilized material and organic matter on the skeletal silica.

By adjusting the amount of combustion air relative to its velocity through cylindrical vessel 42, along with the material feed volume rate, the time of passage through the fireball can be controlled whereby the processed or burned end product will be quenched just after all of the volatile and organic constituents have been removed but prior to oxidation of the remaining carbon attached to the skeletal silica. Sampling the end product will determine the optimum air and material feed rates.

Thus is described a process and apparatus for controlled carbonizing of an agricultural product.

I claim:

1. In a process for treating an agricultural product having a high silica content comprising the steps of
    supplying said agricultural product to a combustion zone,
    supplying hot gasses and combustion air to said combustion zone,
    dispersing said agricultural product in said hot gases and combustion air for controlled burning of said agricultural product at a temperature below that which causes fusion of said skeletal silica in said agricultural product but sufficient to cause evolution and combustion of volatile constituents and organic matter in said agricultural product,
    the improvement comprising
    arresting the combustion process of said agricultural product after evolution of said volatile constituents and organic matter and prior to oxidation of carbon constituents remaining in said agricultural product.

2. The process as claimed in claim 1 further comprising the steps of
    comminuting said agricultural product to a uniform particle size prior to supplying said agricultural product to said combustion zone.

3. The process as claimed in claim 1 further comprising the steps of
    parboiling said agricultural product, and
    dehydrating said parboiled agricultural product prior to supplying said agricultural product to said combustion zone.

4. The process as claimed in claim 3 further comprising the steps of
    comminuting said agricultural product to a uniform particle size after dehydrating said parboiled agricultural product.

5. The process as claimed in claim 1 wherein the step of arresting the combustion process comprises
    chilling said agricultural product to below its ignition temperature by exposing said agricultural product to cold air.

6. The process as claimed in claim 1 wherein the step of arresting the combustion process comprises
    exposing said agricultural product to an inert gas.

7. A process for treating an agricultural product having a high silica content comprising the steps of
    supplying said agricultural product to a combustion zone,
    supplying hot gases and combustion air to said combustion zone, said combustion zone being characterized by said hot gases being swirled about a generally horizontal axis,
    dispersing said agricultural product in said hot gases by rotating said agricultural product in a rotatable cylindrical vessel having a horizontal axis of rotation coincident with the cylindrical axis of said rotatable cylindrical vessel for controlled burning of said agricultural product at a temperature below that with causes fusion of skeletal silica but sufficient to cause evolution and combustion of volatile constituents and organic matter in said agricultural product, and
    arresting the combustion process of said agricultural product after evolution of said volatile constituents and organic matter and prior to oxidation of carbon constituents remaining in said agricultural product.

8. The process for treating an agricultural product as claimed in claim 7 wherein
    said combustion zone is further characterized by hot gases being swirled about a horizontal axis by a first barrier attached to the interior surface of said rotatable cylindrical vessel, said first barrier defining a helix beginning proximate one end of said combustion zone and extending proximate the length of said combustion zone.

9. The process for treating an agricultural product as claimed in claim 7 wherein
    said combustion zone is further characterized by hot gases being swirled about a horizontally disposed central member extending proximate the length of said combustion zone by a second barrier attached to said central support member, said barrier defining a helix beginning proximate one end of said central support member and extending proximate the other end of said central support member.

* * * * *